May 25, 1926.

J. J. HIGGINS 1,585,913

METHOD OF AND APPARATUS FOR SEALING MOUNTS IN ELECTRIC LAMPS

Filed June 4, 1921      2 Sheets-Sheet 1

INVENTOR
JOHN J. HIGGINS
BY
ATTORNEY

May 25, 1926.

J. J. HIGGINS 1,585,913

METHOD OF AND APPARATUS FOR SEALING MOUNTS IN ELECTRIC LAMPS

Filed June 4, 1921   2 Sheets-Sheet 2

INVENTOR
JOHN J. HIGGINS
BY
ATTORNEY

Patented May 25, 1926.

1,585,913

UNITED STATES PATENT OFFICE.

JOHN JOSEPH HIGGINS, OF EAST ORANGE, NEW JERSEY, ASSIGNOR TO WESTINGHOUSE LAMP COMPANY, A CORPORATION OF PENNSYLVANIA.

METHOD OF AND APPARATUS FOR SEALING MOUNTS IN ELECTRIC LAMPS.

Application filed June 4, 1921. Serial No. 475,086.

This invention relates to the art of manufacturing electric lamps and it has special relation to apparatus for and methods of sealing mounts in the bulbs of electric lamps.

An object of the invention is to improve the work-supporting heads employed in machines of the character indicated so that the articles produced thereby shall be free from defects incident to the use of prior apparatus.

A further and more specific object is to provide a machine for automatically and continuously sealing mounts in bulbs and to equip such machines with certain new and improved operating mechanisms for forming the seal and detaching and removing the cullets or waste glass, as will hereinafter more fully appear.

A still further object is to provide a new and useful method for more perfectly forming the seals.

Other objects will be apparent from the following detailed description.

The apparatus heretofore employed for sealing mounts in bulbs of incandescent lamps and which has met with considerable commercial favor, is of the rotary type employing a series of rotatable heads for supporting the mounts and bulbs. These parts are assembled in the heads and successively conveyed to a number of heated zones in which the glass is reduced to sealing temperature, the individual parts or work being rotated during such treatment. At one stage in each cycle, the neck of the bulb is contracted to draw the glass toward the mount in order to effect a juncture of these two parts to form a seal. The method most frequently followed in performing this step, is to permit the weight of the lower end of the neck of the bulb (the cullet) to make the draw-down or contraction. The detachment of the cullet from the neck of the bulb is effected at another step in the movement of the heads. Usually this detachment is accomplished by drawing the cullet down upon a cullet-supporting collar, such action attenuating the glass in the neck and forming a pocket. This action is frequently enhanced by the employment of a pivoted forked lever to so engage the cullet as to exert a downward pressure thereupon. A blast of air is then directed against the thin wall of glass thus formed, at a point just beneath the seal, and usually the force of the blast is sufficient to cause a complete separation of the cullet from the glass. The detached cullet is supported by the cullet-supporting collar and is subsequently removed from the head by means of a pair of tweezers or in some other manner.

Several disadvantages result from employment of the above specified method and apparatus among which is the failure of the contraction step to be satisfactorily performed each time. This is usually due to varying conditions resulting from different weights and qualities of glass and nonuniform sealing temperatures, or for other reasons. Obviously, if the neck is not properly drawn down, the seal will be improperly formed, thus resulting in either a defective lamp or a lamp of impaired strength. Frequently, when the forked gravity lever is employed, the cullet does not form a tight pocket with the cullet support, either because the cullet is not moved down far enough, on account of the limited movement of the pivoted lever, or because the cullet has not been drawn down uniformly. In such instances, the air blast does not operate with sufficient force to effect the separation of the cullet, thus obviously resulting in the formation of a defective or nonuniform lamp.

Another disadvantage resulting from the use of the air blast is that the glass at the seal is too quickly cooled, as a result of which strains and stresses are set up therein. It is probably because of these defects in the glass that the lamps subsequently break, usually at the seal, for no apparent reason.

An apparatus which will perform the sealing-in operation in such manner as to avoid the difficulties heretofore encountered and produce a more uniformly consistent product in appearance, structure and efficiency, is one adapted for operation in a more positive manner than those heretofore in use. By using more positively operated means for performing the constriction-forming operation, for detaching the cullet from the bulb and for removing it from the machine, it is possible to disregard, to a great extent, the indeterminate, variable and unknown factors ever present in performing work of this character.

An illustration of a selected embodiment is made in the accompanying drawings in which.

The mechanism in which the invention is embodied comprises a rotatable carrier or spider which has mounted for rotation thereon, adjacent its periphery, a plurality of spaced-apart work-supporting members, usually termed heads. Upon rotation of the carrier, the heads are indexed at a number of heated zones or stations where a plurality of flames gradually bring the parts of the lamp to be sealed together to sealing temperature. The heads which support these parts include well-known features such as a slidable mount-support for supporting the mounts which usually includes the interior structure of the lamp and the adapter or bulb support for properly positioning the bulb or exterior portion of the lamp in predetermined relationship to the filament carried by the mount. The improved features embodied in the head are a pair of self-centering jaws which engage the neck of the bulb adjacent its lower end or at the cullet to bring the bulb into concentric relationship or axial alignment with respect to the mount. After or during the heating of the parts to be sealed, the jaws are shifted relative to the adapter while the mount support remains stationary, such movement taking place in a direction parallel to the longitudinal axis of the work and resulting in the necking down or the formation of a constriction in the neck of the bulb. The constriction is formed at a point adjacent the flare on the mount and is sufficiently large to cause the glass in the neck and in the flare to join or be sealed together. Shortly thereafter, the self-centering jaws are again moved to further draw down the neck and to detach the waste glass or cullet from the neck of the bulb or the seal. The sealed lamp is then removed from the machine and the mount support and jaws are shifted to bring the cullet to a position above the support where the jaws are opened and the cullet released, the latter sliding down any chute carried by the jaws in a direction away from the operator.

Figures 1, 8, 9:
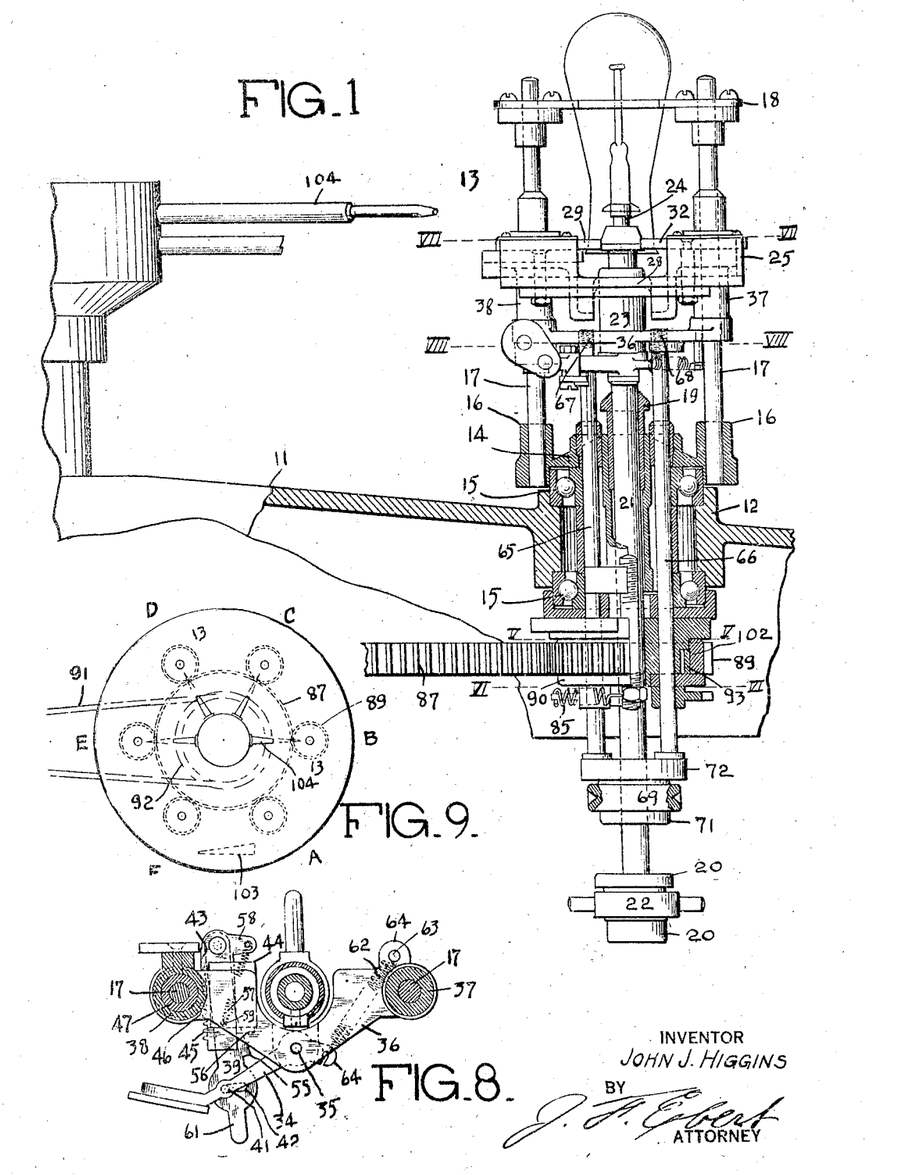
Fig. 1 is a view partially in elevation and partially in section of a machine embodying my invention.
Fig. 8 is a section on the line VIII—VIII of Fig. 1, illustrating the operating means for the slidable jaws and a latching device co-operating therewith.
Fig. 9 is a diagrammatic plan view showing the general arrangement of the heads on a rotatable support at the different indexing stations.

Referring now to Fig. 1 of the drawings, the support for the heads preferably comprises a rotatable spider or carrier 11 suitably mounted for rotation on a frame in a desirable manner. The carrier has rotatably supported in journals 12 adjacent the edge thereof, a number of work-supporting heads 13 which are ordinarily uniformly spaced apart and usually number about six or eight.

Each of the heads is of the same construction and embodies certain features which are well-known in the art, among these being the casting 14 forming the principal support for the other elements of the head. Usually, the casting is supported in the journal 12 by means of ball bearings 15 to reduce friction and has rigidly secured in extension 16, a pair of vertical rods 17 which support, at their upper ends, a bulb support or adapter 18. The adapter is in the form of a U-shaped plate the arms of which are either rigidly or removably secured to the rods 17 while the mouth of the U lies between these rods. If desired, the universal head described in detail in my copending application for a sealing-in machine for electric lamps, Serial No. 467,834, filed May 9, 1921, may be employed or any other desirable form of adapter.

The casting 14 has an upstanding tube 10 constituting a guide for a slidable tubular mount-rod 21 which latter extends vertically through the casting to points above and below the spider 11. The mount-rod is positioned between the rods 17. The lower end of the mount-rod has secured thereto, a yoke or clutch collar 22 which is free to rotate on this rod but is prevented from movement longitudinally therealong by collars 20 fixed to the mount rod on each side of the collar. The yoke is adapted to be engaged either by a foot-treadle (not shown) or by any other member secured to the mechanism, to raise and lower the mount-rod. The upper portion of the mount-rod carries a well-known type of ball chuck 23 for firmly clamping the exhaust tube of the mount of the tipless type of lamp to the mount-rod. The extreme upper end of the mount-rod has removably secured thereto a mount tip 24. Further description of the specific construction of this part of the apparatus is believed to be nonessential, such structures having been in use for many years and are well-known to those versed in the art.

The invention herein concerns itself primarily with improvements in the supporting heads and these improvements relate to devices for more effectively producing the constriction in the neck of the bulb in order to more perfectly form the seal and also relate to a device for completely detaching the cullet or waste glass from the bulb or seal after the seal has been formed, in an even and uniform manner and without the employment of a blast of air. Another feature is to remove the detached cullet from the head without the intervention of the operator.

Figure 3:
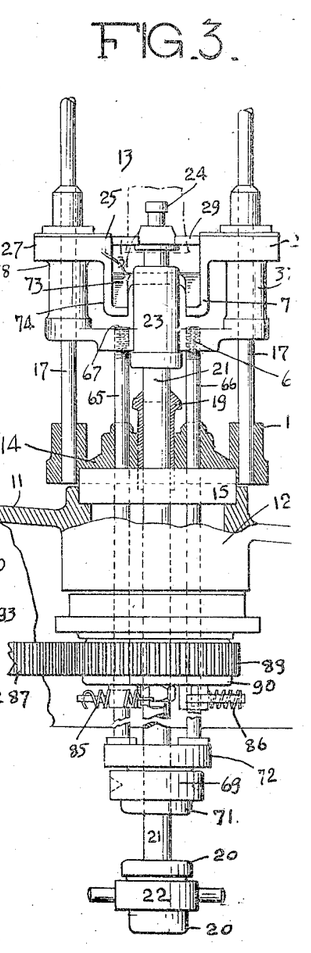
Fig. 3 is a rear elevational view partly in section of the self-centering jaws, illustrating in greater detail the discharge chute attached to the housing supporting these jaws.

A mechanism for accomplishing the recited objects may comprise a casting or housing 25 having substantially rectangular compartments or boxes 26 and 27 (Fig. 3) through which the rods 17 pass. The boxes are connected together by a bridge piece 28 which may be integral with, or secured to, the lower sides of the boxes. Mounted for horizontal reciprocating movement in the housing 25 for centralizing the neck of the bulb with respect to the mount and for accomplishing other objects, are a pair of self-centering jaws. One of these jaws is supported in box 26 and may comprise a plate 29 having a notched work-engaging face 31, and the other a corresponding plate 32 having a similar face 33 and mounted in the box 27. The faces 32 and 33 are adapted to make a two-point contact with the neck of the bulb in order that the latter may be concentrically positioned with respect to a mount carried by the mount rod.

A preferable manner of operating the jaws is through a lever 34 (see Fig. 8) pivotally mounted on a pin 35 extending from a yoke 36 which may be integrally secured to, but spaced from, the boxes 25 and 26 by a pair of sleeves 37 and 38, respectively. The connection between the pivoted lever 34 and the jaws may include a latch link 39 secured to the lever 34 adjacent its outer end by means of a pivot pin 41 extending through a slot 42 in the end of the latch link. The opposite end of the latch is secured to a rack bar 43 guided for horizontal reciprocating movement in an enlarged portion 44 of the yoke 36. The rack bar carries a number of teeth 45 for engagement with a pinion 46 secured to a sleeve 47, the latter having a bearing on the sleeve 38 of the yoke 36. Connection between the slidable jaws and the sleeve 47 may be secured through the instrumentality of a pinion 48 at the upper end of the sleeve and in mesh with a pair of racks 49 and 51, the former of which is secured to, or is integral with, the plate 29, and the latter of which is connected by means of pins 52 and 53 to the plate 29 and the plate 32, respectively, and is also connected to the ends of a link 54. The racks 49 and 51 mesh on opposite sides of the pinion 48 so that, upon oscillation of the latter, the jaws 29 and 32 will be moved toward and from each other. The jaws are maintained in their open position by engagement of a hook 55 on the latch link 39 with a lug 56 depending from the yoke 36. A spring 57 secured to an extension 58 on the rack bar 43 and a pin 59 on the latch 39 tends to urge the hook 55 into engagement with the lug. Release of the latch 39 from its locked position is obtained by pressure being exerted upon the finger lever 61 of the latch.

The lever 34 may be normally urged in the direction to maintain the jaws closed upon release of the latch 39 by means of a spring 62 secured to the yoke at 63 and to an extension 64 on the lever 34.

In order to draw down the neck of the bulb adjacent to the flare on the mount to form the seal, it has been found desirable to use the self-centering jaws. This operation may be effected either at station C or station D or a portion of the operation may be performed at each of these stations. However, it is unimportant when such operation is performed so long as the drawing down takes place prior to the detachment of the cullet.

Mechanism for vertically moving the self-centering jaws may comprise a pair of rods 65 and 66 secured to the yoke 36 at 67 and 68 respectively. The rods 65 and 66 extend downwardly through the casting 14 to a position below the spider 11 and slightly above the clutch collar 22. Reciprocation of the jaws vertically is secured by the operation of the rods 65 and 66 through a clutch collar 69 mounted for rotation on a bearing member 71 secured to a plate 72 connecting the lower ends of the rods. The clutch collar may be engaged by a foot-treadle (not shown) or in any other desired manner in order to reciprocate the jaws to effect the desired operation.

After the neck of the bulb has been constricted, the sealing is completed by lowering the mount support a short distance. This operation may readily be accomplished by exerting pressure on the clutch collar 22 by any desirable instrumentality. Such action telescopes the flare and the neck of the bulb and causes a portion of the flare to form a smooth, rounded edge for the lower portion of the lamp. At the same time, the glass in the seal is stretched or marvered to better condition it at that point so as to prevent subsequent fractures.

The sealing-in operation, at this time, is practically completed and all that remains to be done, is to remove the waste glass or cullet which is suspended from the seal or neck of the bulb. It has been found that this step may be expeditiously accomplished by a further movement of the self-centering jaws in the direction of the axis of the work. Therefore, while the heads are being rotated at the last heated zone or the finishing fires, pressure is again exerted on the clutching collar 69 and the self-centering jaws lowered until the glass joining the cullet to the seal is severed. It is to be noted that this operation may readily take place and that the jaws may be lowered as far as desirable to bring about this detachment, as there is no machine or other structure to interfere with the aforementioned movement. Ordinarily, a slight downward movement is all that is found necessary to effect a complete separation of these parts.

Figure 2:
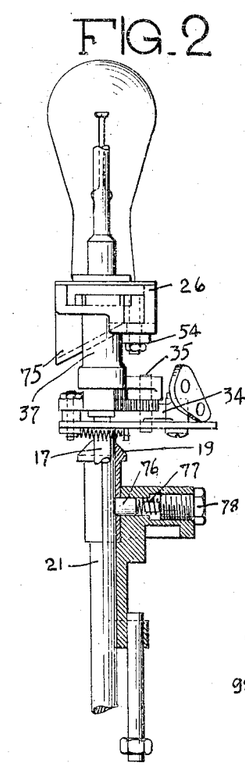
Fig. 2 is a partially sectional side elevational view of the self-centering jaws and discharge chute.

After the cullet has been detached, the sealed lamp is removed from the machine. The cullet however, is still supported in the supporting head by the self-centering jaws and, in order to permit its removal, it is necessary to release the jaws therefrom. This may be done at this stage of the operation but it is preferable to further shift the jaws and the mount support in order to permit the cullet to automatically, and of its own weight, slide out of the head. To assist in completing this operation, a chute 73, more clearly illustrated in Figs. 2, 3, and 4, has been devised. This chute may be integrally formed with the housing 25 or secured thereto in any other desirable manner and the form of chute illustrated comprises two spaced-apart downwardly inclined runways 74 and 75 which embrace and extend on either side of the mount rod. Obviously, upon release of the cullet by the jaws, the former will be free to slide down this chute and out of the machine, after the mount support has been lowered to a point beneath the chute.

Figure 4:
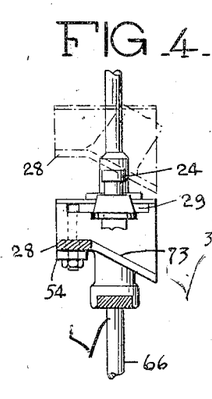
Fig. 4 is a detail view showing the relative position of the chutes and the mount support at the time the cullet is discharged.

In Fig. 4, the full-line position indicates the relative position of the jaws and the mount support before the cullet is released, while the dotted outline shows the relative position of these parts after they have been shifted, the cullet being shown as resting on the chute and about to slide out of the head under action of its own potential energy.

It is obvious that the jaws and the mount-support rod may be shifted relatively to each other by various movements as, for instance, each of these members may be moved in the same or opposite directions, with the one or the other moving at a greater speed, or the one or the other may be held stationary while the other is moved in any appropriate direction.

In shifting the self-centering jaws and the mount rod vertically to the various positions, it is found desirable to maintain them in any position to which they have been shifted and, for this purpose, friction means have been employed. A convenient form of device to prevent free movement of the mount-rod is a friction shoe 76 (Fig. 2) which may be urged against the mount-rod by means of a spring 77 the tension of which may be adjusted by a screw plug 78 having threaded engagement with the casting 14.

A preferable form of friction device for maintaining the self-centering jaws in any desired position of adjustment are a pair of friction levers 79 and 80. These levers may be pivoted at 81 and 82, respectively, on the lower portion of the casting 14 and have openings 83 and 84 through which the rods 65 and 66 extend. These levers are urged against the rods by springs 85 and 86 secured to these levers and to the casting 14.

The friction devices heretofore mentioned also provide means for maintaining the mount rod and self-centering jaws in any desirable position of adjustment with respect to the lower end of a bulb placed in the adapter, as it is frequently found desirable to have such adjustment where different lengths and types of bulbs are being handled in the same machine.

Rotation may be imparted to the spider 11 and to the heads by means of a master gear 87 rotatably mounted in any desirable manner and engaging a series of gears 89 one of which is mounted on each of the heads 13. The master gear may be rotated by means of a belt and pulley 91 and 92, respectively, or otherwise connected to any source of power (not shown). Indexing of the heads at the different stations may be performed in any well-known manner.

Figure 5:
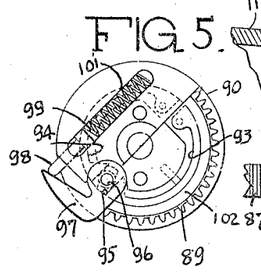
Fig. 5 is a section on line V—V of Fig. 1, showing the means for clutching a driving gear to the heads.
Figure 6:
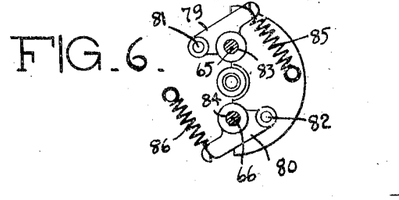
Fig. 6 is a section on the line VI—VI of Fig. 1, illustrating the friction device for maintaining the housing carrying the jaws in different adjusted positions.
Figure 7:
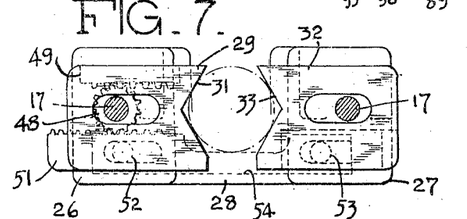
Fig. 7 is a section on line VII—VII of Fig. 1, showing the self-centering jaws.

It has been found desirable to check the rotation of the heads when the work reaches a position opposite the operator and, to provide for such operation, the gear 89 has been constructed in a special manner. This gear supports, interiorly thereof, a pair of friction shoes 93 and 94 pivotally carried by a wall 90 closing the lower portion of the gear. These shoes are normally urged into engagement with the casting 14 by means of a cam 95 mounted on a pin 96 having an arm 97 in engagement with a plug 98 urged against the arm by a spring 99. The spring and the plug are housed in a tube 101 projecting from the wall 90. The cam 95 engages the ends of the shoes 93 and 94 and, in Fig. 5, the cam is shown in its normal position with the shoes urged against a circular track 102 on the casting 14. The arm 97 is designed to engage a cam track 103 so that, upon contact therewith, it will be rotated to such position that the cam 95 no longer engages the shoes 93 and 94 and the gear is thereby released from engagement with the head. It is to be noted that the engagement of the arm 97 with the cam track 103 not only releases the gear from engagement with the head, but also serves to properly position the head with the open side of the adapter toward the operator so that the bulb may readily be removed. This is brought about by reason of the fact that release of the head from its driving force is not effected until rotation of the gear boxes brings arm 97 in contact with cam track 103 which obviously brings the head in the identical position each time. The friction of the shoes on the circular track 102, even when the cam 95 is free therefrom, is sufficient to prevent any relative movement between the head and the gear.

The parts of the lamp to be sealed may be brought to the proper temperature by fires projected from burners 104, placed interiorly of the heads so as to direct the flames away from the operator.

The general operation of the machine may be described as follows:

With the motor running and the parts indexed as shown in Fig. 9, a head may be considered as in position at station A ready to receive the different parts of the lamp to be sealed in. At this stage the self-centering jaws are locked in their open position. The operator then places a mount in the mount-support rod and locks it in position by means of the chuck, and a bulb is next placed over the mount and permitted to rest on the adapter. The self-centering jaws, at this time, are in horizontal alignment with the lower end of the neck of the bulb, this being the normal position of these members. Release of the jaws is then effected and their engagement permitted with the neck of the bulb to centralize or concentrically arrange it with respect to the mount. The carrier or spider then indexes the head at station B and, during movement of the head to that station, the arm 97 moves off the track 103 to permit the gear 99 to be clutched to the head to thus impart rotation thereto. Also, during this movement, the mount-rod is slightly raised to bring the filament of the mount to a position slightly above the light center. When the head reaches station B, it ceases its revolutionary movement but continues rotating about its own axis. A series of flames, at this station, are directed against the neck of the bulb adjacent the flare of the mount to preliminarily heat the parts. The head is next carried to station C where a second heating takes place. If desired, and provided the glass is hot enough, a slight constriction may be formed in the neck of the bulb at this station, however, it is preferable that the constriction in the neck to form the seal, be performed at station D, to which station the head is next moved, but, as stated heretofore, this operation may be performed at any time before the cullet is removed. To form the constriction, the jaws are lowered in the direction of the longitudinal axis of the work, thus exerting a uniform pressure at all points and forming a good seal. The head may then be indexed at station E and while being carried to that station, the mount rod slightly lowered, provided the constriction in the neck has been made by lowering the jaws. The lowering of the mount-rod works and marvers the glass in the seal to better condition it so as to prevent subsequent fractures therein and also brings the filament back into the light center.

At station E a plurality of fires of extreme fineness and of intense heat may be directed at a point slightly below the seal and substantially at the same time, the jaws are further lowered to separate or detach the cullet from the seal. After the detachment has been effected, the head is carried to station F where the parts are permitted to cool and the glass to set. The head is then indexed at station A and, while being carried to that station, rotation thereof is discontinued by engagement of the arm 97 with the cam track 103, such operation also positioning the head with the opening in the adapter toward the operator. At station A, the operator first removes the sealed lamp and places it in a rack, thereafter the mount-rod and jaws are relatively shifted to bring the former below the chute. The lever 34 is next operated to open the jaws to release the cullet which thereupon, falls on the chute and is carried out of the head away from the operator and is discharged from the machine in substantially a lateral direction under its own potential energy. The jaws and the mount-rod may then be returned to their normal positions and the operations repeated.

The structural details of the machine and of the method outlined, may be variously modified without departing from the spirit and scope of the invention and it is, therefore, to be understood that the invention is not to be restricted to the precise embodiment herein shown and described but that it comprehends all such modifications as fall within the scope of the appended claims.

What is claimed is:

1. A head for a sealing-in machine comprising means for supporting a bulb, means for supporting a mount and positively rectilinearly operable means for separating the waste glass from the bulb.

2. A head for a sealing-in machine comprising means for supporting a bulb, a mount support, means for severing the cullet from the supported bulb and means for effecting a lateral movement of the cullet from the head.

3. A head for a sealing-in machine comprising means for supporting a bulb, a mount support, means for severing the cullet from said bulb, means for moving the mount support relatively to said severed cullet and means for effecting a bodily movement of said cullet from the machine.

4. A head for a sealing-in machine comprising means for supporting a bulb, means for supporting a mount, positively operable means movable in a rectilinear path for separating the cullet from the bulb and means to effect a movement of the cullet substantially transverse to the vertical axial line of said head.

5. A head for a sealing-in machine comprising means for supporting a bulb, means for supporting a mount, positive downwardly movable means for separating the cullet from the bulb, means for effecting a relative movement of said mount supporting means and said cullet to release the cullet and to permit the same to move from the head.

6. A head for a sealing-in machine comprising means for supporting a bulb, means for supporting a mount, positive unidirectionally operable means for separating the cullet from the bulb, means for effecting a relative movement of said mount supporting means and said cullet to release the cullet to permit the same to move from the head and means for guiding the cullet in a direction substantially transverse to the vertical axis of the head.

7. A head for a sealing-in machine comprising a bulb support, a mount support, a cullet receiving member and means for effecting a relative longitudinal movement between said member and said mount support.

8. A head for a sealing-in machine comprising a bulb support, a mount support, means for effecting a relative movement between said bulb support and said mount support and means for discharging said cullet from said machine in a substantially lateral direction.

9. A head for a sealing-in machine comprising a bulb support, a mount support, slidable jaws for gripping the lower portion of a bulb and means for causing a relative movement by said jaws and said bulb support, cullet receiving means to support the cullet when severed from said bulb, said cullet receiving means having an inclined guide for effecting a discharge of said cullet from said head.

10. A head for a sealing-in machine comprising a bulb support, a mount support, jaws for gripping a cullet, means for causing a relative movement by the said bulb support and said mount support, cullet receiving means to support a cullet when severed from a bulb, said cullet receiving means including a guide for effecting a discharge of the cullet side-wise from the head.

11. A head for a sealing-in machine comprising a bulb support, a mount support, bulb neck engaging means, means for moving said last mentioned means positively and in a rectilinear path to separate the cullet from the neck of the bulb.

12. A head for a sealing-in machine comprising a bulb support, a mount support, a cullet receiving member, bulb neck engaging means, means for actuating said engaging means to separate the cullet from said bulb neck for deposit upon said cullet receiving member.

13. A head for a sealing-in machine comprising a bulb support, a mount support, a cullet receiving member, bulb neck engaging means, means for actuating said engaging means unidirectionally to separate the cullet from said bulb neck for deposit upon said cullet receiving member, means for permitting a movement of the cullet by gravity and means for directing said cullet laterally from said head.

14. A head for a sealing-in machine comprising a bulb support, a mount support, means for centralizing the bulb with respect to said mount, means for engaging the neck of said centralized bulb, means for changing the relative positions of said centralizing means and said neck engaging means to separate the cullet from said neck, a cullet receiving member having a guide for discharging a cullet from said machine.

15. In a sealing-in machine, the combination of means for supporting a bulb and positive operable means for separating a cullet from the bulb, said means operating to move and maintain the cullet in a predetermined vertical path during separation from the bulb.

16. In a sealing-in machine, the combination of means for supporting a bulb and positive operable means for separating the cullet from the bulb, said means operating to move and maintain the cullet in a predetermined vertical path and an inclined guide positioned to receive the cullet and guide the same from the head.

17. In a sealing-in machine, the combination of means for engaging the neck of the bulb adjacent its lower end, positively operated means for causing a slight relative movement between the bulb and said means to produce a constriction in said neck and means for causing further relative movement between the bulb and said engaging means for separating the part engaged from the rest of the bulb.

18. In a sealing-in machine, the combination of positively and unidirectionally actuated means for separating a cullet from a bulb and means for permitting a substantially lateral movement of the cullet under the action of its potential energy from the machine.

19. In a sealing-in machine, the combination of means for supporting a bulb, means for engaging the neck of a bulb, means for positively and rectilinearly moving said engaging means to form a constriction in the neck of the bulb and means for continuing said movement to separate the lower portion of the neck from the bulb.

20. In a sealing-in machine, the combination of means for supporting a bulb, means for engaging the neck of said bulb, means for intensely heating the bulb with a high velocity flame, means for changing the relative positions of the bulb support and said engaging means to provide a constriction at the heated portion and means for continuing the movement of said engaging means in a positive rectilineal path to separate the lower portion of the bulb from the neck thereof.

21. In a sealing-in machine, the combination of means for supporting a bulb, a mount support, means for engaging the neck of said bulb to centralize it with respect to said mount support, means for effecting a relative movement of said engaging means to produce a constriction in the neck of said bulb for union with a mount in said support and means for moving said engaging means in a rectilinear path to separate the cullet from said bulb.

22. In a sealing-in machine, the combination of means for supporting a bulb, a mount support, means for engaging the neck of said bulb to align the same with the axial line of a mount in said support, means for causing a relative rectilinear movement of said engaging means and said bulb support for maintaining said axial alignment to remove the cullet from said bulb.

23. In a sealing-in machine, the combination of means for supporting a bulb, means for engaging the neck of said bulb to align the same with the axial line of a mount, means for causing a relative movement of said engaging means and for maintaining said axial alignment to remove the cullet from said bulb and means for causing a removal of the detached cullet in a substantially laterally direction from the head.

24. In a sealing-in machine, the combination of means for supporting a bulb, positively operated means movable in a rectilinear path for separating a cullet from a bulb and means for maintaining said rectilinear movement during the separating operation.

25. In a sealing-in machine, the combination of a bulb support, a mount support, a cullet discharge chute and means for effecting a relative longitudinal movement of said mount support and said chute to permit a discharge of the cullet.

26. In a sealing-in machine, the combination of a bulb support, a mount support, means for engaging the neck of the bulb to contralize the same with respect to said bulb support, a cullet discharging chute, means for changing the relative position of said engaging means and said bulb support to form a constriction in the neck of said bulb to bring the wall of said neck in contact with the edge of a mount in said support, means for further moving said engaging means to detach the cullet from said neck and deposit the same in said chute.

27. In a sealing-in machine, the combination of a support for a bulb, means for engaging the neck of said bulb to centralize the same with respect to said support, means for causing a relative movement between said engaging means and said support to form a constriction in the neck of said bulb, means for continuing the movement of said engaging means to detach a cullet from said bulb and means for depositing said cullet on said support.

28. In a sealing-in machine, the combination of a support for a bulb, means for engaging the neck of said bulb to centralize the same with respect to said support, means for causing a relative movement between said engaging means and said support to form a constriction in the neck of said bulb, means for continuing the movement of said engaging means to detach a cullet from said bulb, means for depositing said cullet on said support and an inclined chute associated with said support to direct the cullet from said machine.

29. In a sealing-in machine, the combination of a bulb support, a mount support, means for engaging the neck of a bulb, means for changing the relative position of said engaging means and said bulb support to form a constriction in the neck of said bulb, a cullet support having an inclined surface to receive a cullet, means for moving said engaging means to separate the cullet from said bulb and means for changing the relative positions of said mount support and said cullet support.

30. A sealing-in machine comprising a support for a bulb, a support for a mount arranged in axial alignment with the first support, a pair of horizontal slidable jaws adjacent said mount-support, means for bodily moving said jaws approximately parallel to said mount support and means for moving said jaws horizontally, whereby, upon movement of said jaws horizontally, a bulb positioned in said bulb support will be engaged to concentrically position the same with respect to a mount placed in said mount-support, and, upon bodily movement of said jaws parallel to said mount support, said portion of said bulb engaged thereby will be moved with respect to said bulb to effect separation from the bulb after a seal has been formed between said bulb and said mount.

31. A sealing-in machine comprising a spider, a pair of parallel rods vertically supported thereby, a bulb support mounted at the upper ends of said rods, a mount-support placed between said rods and movably mounted in said spider, a housing slidably mounted on said rods below said bulb support, a pair of jaws mounted for horizontal movement in said housing, said jaws being normally positioned in approximate alignment with the upper end of said mount-support, means carried by said rods for actuating said jaws means including latching elements to hold said jaws in open position, means for actuating said housing to raise and lower said jaws with respect to the bulb-support and means for actuating said mount-support to lower the mount supported thereby with respect to the bulb and said housing.

32. A sealing-in machine comprising a spider, a pair of parallel rods vertically supported thereby, a bulb support mounted at the upper ends of said rods, a mount-support placed between said rods and mounted in said spider, a housing carrying downwardly inclined guides, a pair of jaws mounted for horizontal movement in said housing, said jaws being normally positioned in approximate alignment with the upper end of said mount-support, means carried by said rods for actuating said jaws and means including latching elements to hold said jaws in open position, means for actuating said housing to raise and lower said jaws with respect to the bulb-support and means for actuating said mount-support to lower the mount supported thereby with respect to the bulb and said housing.

33. A sealing-in machine comprising a spider, a pair of parallel rods vertically supported thereby, a bulb support mounted at the upper ends of said rods, a mount-support placed between said rods and slidably mounted in said spider, a housing slidably mounted on said rods below said bulb support, said housing carrying downwardly inclined guides, a pair of jaws mounted for horizontal slidable movement in said housing, said jaws being normally positioned in approximate horizontal alignment with the upper end of said mount-support, means carried by said rods for horizontally actuating said jaws and means including latching elements to hold said jaws in open position, means for heating the bulb to plasticity adjacent the upper end of the mount-support, means for actuating said housing to raise and lower said jaws with respect to said bulb-support and means for actuating said mount-support to lower the mount supported thereby with respect to the bulb and said housing.

34. In a sealing-in machine, the combination of a carrier, a plurality of heads supported on said carrier, and positively and rectilinearly operable means associated with each of said heads for removing cullets from bulbs supported in the heads.

35. In a sealing-in machine, the combination of a rotatable support, a plurality of heads carried thereby, means for rotating said support and positively unidirectionally operated means co-operating with said heads for removing cullets from the work supported thereby by movement in the direction of the axial line of said work and means for discharging cullets in substantially a lateral direction from the machine.

36. In a sealing-in machine, the combination of a rotatable support, a plurality of heads mounted thereon for rotation, means for rotating said heads, a plurality of heating elements adjacent said support, means for rotating said support and indexing said heads with respect to said heating elements, means for engaging the work to concentrically position the parts making up the work, positively unidirectionally operated means for detaching the cullets from the work by movement on the axial line of said work and means for removing the detached cullets from said heads, means for effecting a bodily movement of cullets sidewise from said machine.

37. In a sealing-in machine, the combination of a rotatable support, a plurality of heads mounted thereon for rotation, means for rotating said heads, a plurality of heating elements adjacent said support, means for indexing said heads adjacent said elements, means for engaging the work parts to align the same, means for relatively moving the different parts of the work to dispose the same in predetermined relation, means for mechanically operating said engaging means in a predetermined path to detach the waste glass after sealing said means also permitting removal of said detached glass by the inherent potential energy thereof and means for guiding cullets in substantially a lateral direction from said machine.

38. In a sealing-in machine, the combination of a rotatable carrier, heads rotatably supported by said carrier, a plurality of heating stations, means for indexing said heads at said stations, means for effecting relative movement between the parts of said work to dispose the same in predetermined position and to seal them together, means mechanically operating in an undeviating path to detach the waste glass, said means subsequently operating to release the detached glass to permit its removal, means for rotating said carrier and said heads and a guide for directing cullets bodily in a direction substantially transverse to said heads.

39. In a sealing-in machine, the combination of a rotatable carrier, heads rotatably supported by said carrier, a plurality of heating stations, means for indexing said heads at said stations, means for effecting relative movement between the parts of said work to dispose the same in predetermined position and to seal them together, mechanical means operating parallel to the vertical axis of the work to detach the waste glass, said means subsequently operating to release the detached glass to permit its removal by its inherent potential energy and means for rotating said carrier and said heads.

40. In a sealing-in machine, the combination of a rotatable support, a plurality of heads rotatably mounted in said support; each of said heads comprising a pair of vertical rods, an adapter secured to the upper ends of said rods, a mount-support between said rods and slidably mounted in said rotatable support, a housing slidable on said rods between said adapter and said mount-support, a chute carried by said housing, horizontal jaws slidably mounted in said housing, means carried by said rods for operating said jaws, means for rotating said support and said heads and means for sliding said housing.

41. The method of sealing a mount in a bulb consisting in assembling a mount and a bulb in predetermined relationship, applying heat to the bulb and mount adjacent the lower part thereof to reduce the glass to sealing temperature, holding one part of the bulb stationary while positively and unidirectionally moving another part to produce a constriction in the bulb adjacent the lower end of the mount to make the seal, telescoping the mount and the bulb to work the glass in the seal and bring the filament to the light center, then detaching the waste glass from the bulb by a positive motion in the direction of the longitudinal axis of the work and guiding the same in a direction substantially transverse to the axis of the work.

42. The method of sealing a mount in a bulb consisting in assembling a mount in predetermined relation to a bulb, applying heat to the bulb adjacent its lower end, holding one part of the bulb stationary while longitudinally moving another part to form a constriction in the bulb for making the seal, lowering the mount in the bulb to bring the filament into light-center position and to work the glass at the seal, further positively moving the moved part in the direction of the axis of the work to separate the waste glass from the bulb and thereafter releasing the waste glass to permit its removal by its own weight.

43. The method of sealing a mount in a bulb consisting in supporting a mount, placing a bulb over the mount and supporting it in predetermined relation to the mount, applying a force at right angles to the longitudinal axis of the bulb to move the bulb into axial alignment with said mount, holding the bulb in that position, applying heat to the bulb and mount, manipulating the bulb to produce a constriction therein adjacent the flare of the mount, lowering the mount with respect to the bulb to produce the seal and work the glass, removing waste glass from the bulb by applying a force positively acting along the vertical axis of the work and thereafter permitting the detached glass to be removed by its potential energy.

44. The method of sealing a mount in a bulb consisting in assembling the parts, applying heat and then sealing them together and thereafter removing the waste glass by positive unidirectional relative movement between the lamp and the cullet in the line of the axis of the work.

In testimony whereof, I have hereunto subscribed my name this third day of June, 1921.

JOHN JOSEPH HIGGINS.